Figure 1:
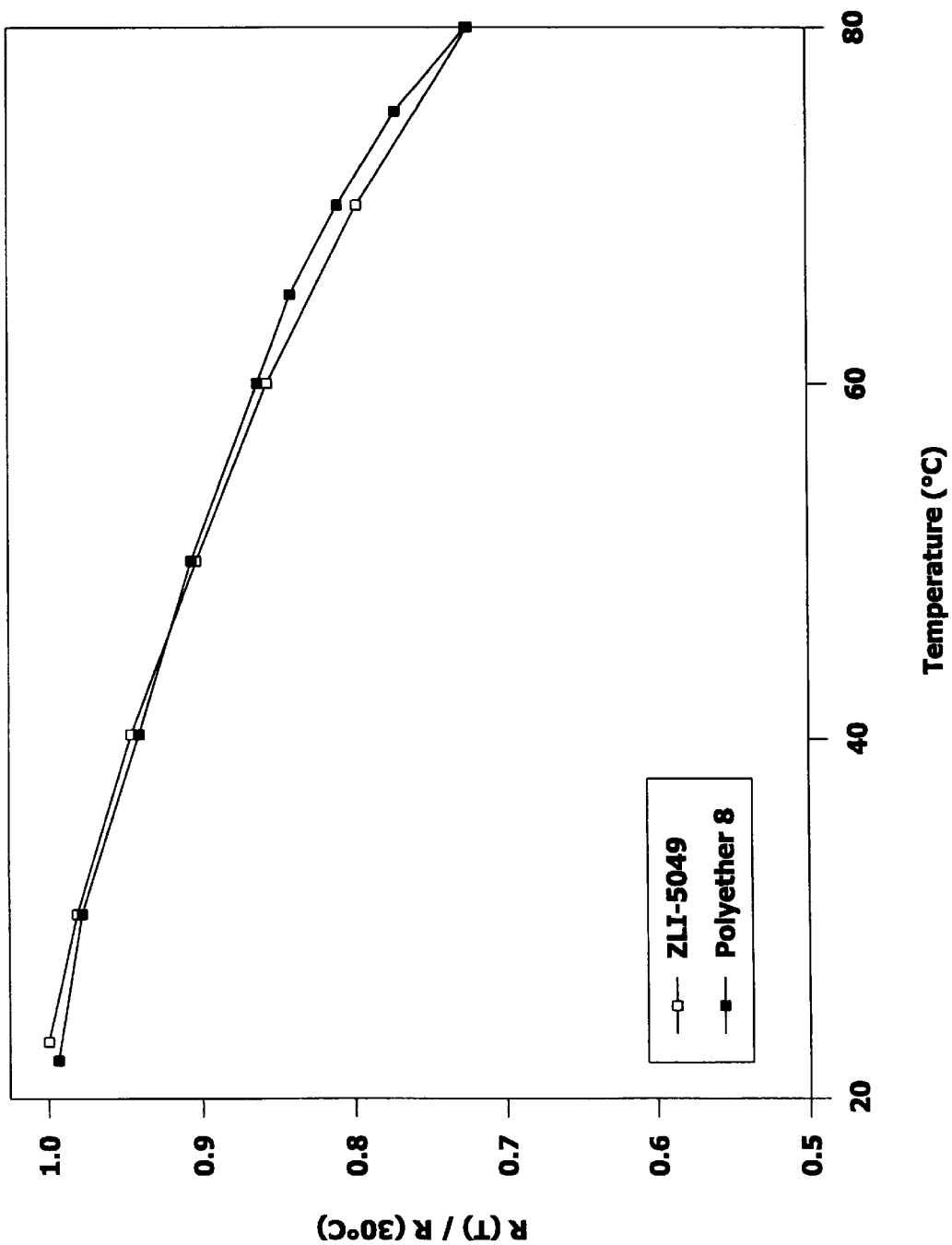

United States Patent [19]
De Wit et al.

[11] Patent Number: 6,088,077
[45] Date of Patent: Jul. 11, 2000

[54] TEMPERATURE MATCHED RETARDATION LAYER

[75] Inventors: Paulus Pieter De Wit, Westervoort; Stephen James Picken, Velp; Andre Steenbergen; Martin Bosma, both of Arnhem, all of Netherlands

[73] Assignee: Akzo Nobel nv, Arnhem, Netherlands

[21] Appl. No.: 09/099,507

[22] Filed: Jun. 18, 1998

Related U.S. Application Data

[63] Continuation of application No. PCT/EP96/05747, Dec. 16, 1996.

[30]     Foreign Application Priority Data

| Dec. 22, 1995 | [EP] | European Pat. Off. ............... 95203567 |
| May 7, 1996 | [EP] | European Pat. Off. ............... 96201247 |
| Sep. 23, 1996 | [EP] | European Pat. Off. ............... 96202646 |

[51] Int. Cl.⁷ ....................... G02F 1/1335; G02F 1/1337; C09K 19/52; F21V 9/00
[52] U.S. Cl. ..................... 349/117; 252/299.01; 252/582; 349/62; 349/123
[58] Field of Search .............................. 252/299.01, 582, 252/299.62; 428/1; 349/62, 117, 123

[56]                References Cited

U.S. PATENT DOCUMENTS

| 5,380,459 | 1/1995 | Kanemoto et al. ................. 252/299.01 |

FOREIGN PATENT DOCUMENTS

| 362714 | 4/1990 | European Pat. Off. ........ C09K 19/12 |
| 402103 | 12/1990 | European Pat. Off. ...... G02F 1/1337 |
| 423881 | 4/1991 | European Pat. Off. ...... G02F 1/1335 |
| 469492 | 2/1992 | European Pat. Off. ......... C08G 59/14 |
| 559081 | 2/1992 | European Pat. Off. .......... G02B 5/30 |
| 573278 | 12/1993 | European Pat. Off. .......... G02B 5/30 |
| 617111 | 9/1994 | European Pat. Off. ........ C09K 19/40 |
| 678567 | 10/1995 | European Pat. Off. ........ C09K 19/38 |
| WO 90/15092 | 12/1990 | WIPO ........................... C08G 65/28 |
| WO 95/09379 | 4/1995 | WIPO ........................... G02F 1/1335 |
| WO 96/03476 | 2/1996 | WIPO ........................... C09K 19/22 |
| WO 96/06145 | 2/1996 | WIPO ........................... C09K 19/38 |

*Primary Examiner*—C. H. Kelly
*Attorney, Agent, or Firm*—Richard Fennelly

[57]                  ABSTRACT

The invention is directed to a liquid crystalline display comprising a display cell containing liquid crystalline material and a retardation layer. The retardation layer comprises a, preferably slightly cross-linked, high-molecular weight material layer and a substrate, wherein the high-molecular weight material has a nematic phase above its Tg and a dynamic viscosity at the working temperature of at least 100 Pa.s. The difference of the Tc of the high-molecular weight material and the Tc of the low-molecular weight material of the display cell ($TC_{cell}$) is in the range of −30° C. to +30° C., preferably in the range of −20° C. to +20° C., and more preferably in the range of −10° C. to +10° C.; and the Tg of the high-molecular weight liquid crystalline material is lower than 50° C. It was found that if high-molecular weight material is used with a Tc comparable with that of the, preferably low-molecular weight, liquid crystalline material of the active cell, the temperature dependency of the retardation value of the retardation layer is comparable with that of the active cell. Thus, the retardation value of the retardation layer is comparable with that of the active cell within the temperature range in which displays are used. It was further found that by cross-linking of the high molecular weight liquid crystalline material, the retardation layers according to the invention become less susceptible to pinhole forming and unwanted variation of the twist, and have improved mechanical stability.

14 Claims, 3 Drawing Sheets

TEMPERATURE MATCHED RETARDATION LAYER

This is a continuation of PCT International Application No. PCT/EP96/05747, filed Dec. 16, 1996.

The present invention is in the field of liquid crystalline displays comprising an active cell containing a low-molecular weight liquid crystalline material and a retardation layer, the retardation layer comprising a high-molecular weight material layer and a substrate.

Due to birefringence effects, super twisted nematic (STN) liquid crystalline active cells show a poor contrast and a poor viewing angle and are not achromatic, which limits their use in color displays. In twisted nematic (TN) cells the viewing angle is not optimal. Retardation layers can improve the viewing characteristics of liquid crystalline display cells. Uniformly stretched polymer films, mainly polycarbonate films, are often used as retardation layers. Although these layers improve the optical behavior of (S)TN liquid crystalline displays considerably, they cannot fully compensate for the effects of the birefringence of the active cell of the display since they lack the required twisted structure. The objectionable color effects of (S)TN liquid crystalline displays are more successfully compensated for by using a second (S)TN layer stacked with its optical axis perpendicular to the optical axis of the active cell. Optimum compensation for perpendicular incident light is realized when the (S)TN layer has the same absolute retardation value ($\Delta$n.d), the same dispersion (wavelength dependence of $\Delta$n), an equal twist angle, and a twisting direction opposite to that of the (S)TN active cell. These criteria apply at all temperatures at which the display operates.

The superior compensating quality of (S)TN retardation layers is shown in D-STN displays, where the optical effects of the STN active cell for perpendicular incident light are fully compensated for by using a second, identical STN cell with an opposite twist. D-STN displays have a high image quality but suffer from their heavy weight and thickness. The disadvantages of D-STN displays can be avoided by using (S)TN retardation layers based on high-molecular weight liquid crystalline material. The retardation layer is usually positively birefringent when the mesogenic moieties of the high-molecular weight material have a calamitic (rod-like) structure and usually negatively birefringent when the mesogenic moieties of the high-molecular weight material have a discotic (disc-like) structure. In PCT Published Patent Application WO 96/06145 retardation layers of liquid crystalline polyethers are described. In PCT Published Patent Application WO 96/03476 retardation layers of liquid crystalline glasses are described. With these retardation layers compensation for the (S)TN liquid crystalline active cell can be realized using only one, thin, lightweight layer. The twist angle, the twisting direction, and the retardation can easily be matched to those of the (S)TN active cell. In PCT Published Patent Application WO 95/09379 it is described how the dispersion of these layers can be finely tuned to match the requirements of the (S)TN active cell. However, problems still have to be solved to obtain optimum retardation layers. If the liquid crystalline display is subjected to temperature changes, the retardation value changes too, whereas the twist angle, the twisting direction, and the dispersion are not altered by a change of temperature. The decrease of the retardation value of the liquid crystalline active cell with increasing temperature (and vice versa) is caused by the decrease of the birefringence of the low-molecular weight liquid crystalline material used in the active cell. The temperature dependence of the birefringence of the liquid crystalline material increases as the temperature approaches the clearing temperature (Tc), whereas the birefringence (and consequently the change in birefringence) of liquid crystalline material is zero above Tc. The known high-molecular weight liquid crystalline materials used for retardation layers have a smaller temperature dependence of the birefringence in the temperature range in which displays are used (–40 to 90° C., hereinafter referred to as the working temperature) than the low-molecular weight liquid crystalline materials used in the active cells. In EP 678,567 a retardation layer comprising a polymerized liquid crystal oligomer having positive birefringence has been described. However, no properties of said compensation layer with respect to the properties of the display cell onto which the retardation layer is applied have been disclosed, and thus the conditions to obtain a temperature dependence which is similar in both the retardation layer and the display cell are not known. A method of making a compensator for a liquid crystal display has been disclosed in EP 573,278. The method is, however, directed to obtain a high degree of uniformity in film thickness, rather than to attain temperature-matched compensation between retardation layer and display. Notably, no conditions have been disclosed to attain temperature-matched compensation between the retardation layer and the display cell. Moreover, no detailed synthetic prescriptions are disclosed for the preparation of the liquid crystalline side chain polymers, and more importantly, the method for obtaining the compensation layer appears to be non-operable.

The present invention provides liquid crystalline displays with a retardation layer showing improved temperature-matched compensation behavior in the temperature range in which displays are used, while the advantages of light weight, low cost, and easy handling remain. The invention is directed to a liquid crystalline display comprising an addressable display cell containing liquid crystalline material and a retardation layer, said retardation layer comprising a high-molecular weight material layer and a substrate, wherein the high-molecular weight material has a nematic phase above its Tg and a dynamic viscosity at the working temperature of at least 100 Pa.s, and the difference of the Tc of the high-molecular weight material and the Tc of the low-molecular weight material of the display cell (Tc$_{cell}$) is in the range of –30° C. to +30° C., preferably in the range of –20° C. to +20° C., and more preferably in the range of –10° C. to +10° C.; and the Tg of the high-molecular weight liquid crystalline material is lower than 50° C.

Preferably, the liquid crystalline material of the active cell is low-molecular weight material. Preferably, the high-molecular weight material layer is slightly cross-linked.

It was found that when high-molecular weight material is used with a Tc comparable with that of the low-molecular weight material of the active cell, the temperature dependence of the retardation value is comparable with that of the active cell. Thus, the retardation value of the retardation layer is comparable with that of the active cell within the temperature range in which displays are used. Within this context high-molecular weight material means material with a molecular weight higher than 1000. Of course, the high-molecular weight material should have a nematic or discotic nematic phase above its Tg, this in order to obtain a ((super) twisted) nematic structure. It is further necessary that the dynamic viscosity of the high-molecular weight material is above 100 Pa.s at the working temperature, because otherwise the mechanical resilience of the retardation layer per se is not high enough.

Within the context of this invention Tg and Tc values are determined by the differential scanning calorimeter (DSC) method.

Within this context slightly cross-linked means cross-linked so as not to alter the dynamic viscosity to above $10^7$ Pa.s at 55° C. or higher. This, for instance, is the case with the acrylate network described in EP-A1-423,881, as is stated in lines 34–43 of column 6 of this publication. It was found that by slightly cross-linking of the high-molecular weight liquid crystalline material, the retardation layers according to the invention become less susceptible to pinhole forming and unwanted variation of the twist angle due to temperature variation, and have improved mechanical stability.

A high-molecular weight liquid crystalline material which fulfills the above-given requirements has a Tg lower than 50° C., and preferably has a Tg of –50 to +35° C., more preferably of 0 to +35° C., and a Tc of 60 to 130° C., more preferably of 80 to 130° C., because low-molecular weight liquid crystalline material for the active cell usually has a Tc in those ranges, and with Tg values of –50 to +35° C. material with suitable dynamic viscosities is obtained.

The invention is directed to both uniform-planar oriented retardation layers and to chiral nematic (including (S)TN) retardation layers. In the case of the uniform planar retardation layers an optimal temperature matched retardation is obtained, but for compensation of (S)TN active cells, the best result is obtained when the retardation layer has an equal twist angle, an opposite twist direction, and an equal retardation value. Liquid crystalline displays according to the invention are preferred wherein the high-molecular weight material layer has a chiral nematic structure. A chiral nematic structure is obtained by placing the high-molecular weight liquid crystalline material containing a chiral dopant on an orienting substrate or between two orienting substrates, optionally giving one of the substrates a different orientation direction from that of the other substrate. Various techniques are known for making an orienting substrate. For instance, the substrate itself may be rubbed in a single direction. The substrate in that case may be made of, e.g., polyimide, polyvinyl alcohol, glass, amorphous polyolefins, substituted celluloses, etc. Alternatively, the substrate may be provided with a thin orienting layer. This may be a thin polymer layer that can be rubbed, e.g., polyimide, polyvinyl alcohol, etc. Alternatively, this thin orienting layer may be a $SiO_x$ layer evaporated at an angle of less than 90°, usually of 60° or 86°. Generally, a substrate of poor flexibility, such as glass or quartz, is used for $SiO_x$ evaporation. These orienting techniques are known to the skilled person and require no further elucidation here. Of course, it is also possible to employ other orienting techniques.

To control the direction of rotation of the director (to the left or to the right) and/or to obtain an angle of rotation greater than 90°, or when only one orienting substrate is used to obtain a sufficient angle of rotation, the liquid crystalline material is mixed with a chiral material: the so-called chiral dopant. In principle, any optically active compound may be used to this end. As examples may be mentioned cholesterol derivatives and 4-[(4-(hexyloxy) benzoyl)oxy]benzoic acid 2-octyl ester. Ordinarily speaking, up to 5% by weight of chiral dopant is employed in relation to the total amount of liquid crystalline material. Alternatively, the liquid crystalline material itself may be provided with chiral centers. The angle of rotation of an STN display cell typically is 180–270° (or –180 to –270°) but may be any other appropriate value. In the case of an angle of rotation of 90° (or –90°), the film is generally called "twisted nematic." For a TFT-TN compensation layer an angle of rotation of 90° (or –90°) is required. If the angle of rotation is greater, the film is called "super twisted nematic."

In addition, this invention also concerns retardation layers with a smaller angle of rotation, from 0° (no twist) to 90° (or –90°). At angles of rotation exceeding 360° the structure goes through more than one full rotation within a single layer. The length covered by the structure in a full rotation is called the pitch. The invention is also directed to layers with a thickness greater than one pitch (even more than 10 pitches), which can suitably be used as cholesteric reflectors.

The value of optical retardation ($=\Delta n$ (birefringence)$\times d$ (thickness of the (S)TN layer) may be adjusted by choosing an appropriate value for the thickness of the layer. When two orienting substrates are used, this can be done by using spacers of appropriate size. In general, glass spheres, polymer spheres or silica spheres are used as spacers. When only one orienting substrate is used, the thickness of the layer is controlled by accurate coating techniques such as extrusion-coating, meniscus-coating, and spin-coating.

The retardation layer can be placed between a polarizer and the active cell. It is also possible to use one of the active cell walls or a polarizer as a substrate for the retardation layer. In this way the thickness and the weight of the resulting liquid crystalline display are further reduced.

Suitable high-molecular weight liquid crystalline material for the retardation layer can be chosen from liquid crystalline glasses, liquid crystalline side chain polymers such as polyethers, poly(meth)acrylates, polyvinyl ethers, and polysiloxanes. Especially preferred are the liquid crystalline polyethers polymerized according to the activated monomer mechanism. In PCT/EP 95/03176 polyethers are described which are obtained by the activated monomer mechanism. The polyethers described there, however, do not fulfill the requirements given above. Either the Tc is too high or the Tg is too high. But with the method described in said publication, liquid crystalline polyethers can be obtained which do fulfill the Tc and viscosity requirements. Therefore, liquid crystalline displays according to the invention are preferred wherein the high-molecular weight material is a polyether obtained by polymerizing a monomer mixture comprising:

a) an OH-containing compound, and b) a mesogenic group-containing mono-epoxide.

Starting from the polyethers as described in PCT/EP 95/03176 several steps can be taken to make polyethers fulfilling the viscosity and Tc requirements. The first of these is to use mesogenic group-containing mono-epoxides with spacers. The polyethers described in the PCT application all are prepared from mesogenic group-containing mono-epoxides that have a oxiranylmethoxy moiety (i.e., the part of the compound that is not the mesogenic group). It was found that when mesogenic group-containing compounds were used with longer spacers, polyethers with a satisfactory Tc and viscosity were obtained.

The second measure is to include non-mesogenic epoxides, preferably aliphatic epoxides such as oxiranyl-methane (propylene oxide), 2-ethylhexyl glycidyl ether, and oxiranylethane, in the monomer mixture and thus lower the mesogenic group density. Up to 40 mole % of the total epoxide compounds may be oxiranylmethane. These aliphatic epoxide-containing polyethers have not been described before. The present invention is also directed to these novel aliphatic epoxide-containing liquid crystalline polyethers.

When preparing liquid crystalline polyethers according to the activated monomer mechanism, it is preferred that the epoxide groups/hydroxy groups ratio in the monomer mixture is in the range of 5:1 to 1:1. This has as a result that side reactions, notably the formation of cyclic oligomers, are suppressed to such an extent that polymers of a narrow molecular distribution are formed. Moreover, polyethers formed almost exclusively by the activated monomer mechanism are essentially OH-terminated, which gives advantages for cross-linking.

In the polyethers for use in the liquid crystalline display according to the invention use may be made of virtually any OH-containing compound, both mono-OH-containing compounds and di-and tri-OH-containing compounds. Examples include aliphatic alcohols, diols, triols, acrylate alcohols, acrylate diols, mesogenic group-containing alcohols, and aromatic compounds containing an OH group in a non-aromatic part of the compound.

Especially suitable mono-OH-containing compounds are those according to the formula below:

HO—(Y)$_m$—Z wherein:

Z stands for H (when m≠0), —O—C(O)—CH=CH$_2$, —O—C(O)—C(CH$_3$)=CH$_2$, a cyclic, aromatic, or heterocyclic compound having 4–10 carbon atoms, which compound may comprise a mesogenic group, —CH(CH$_2$—O—C(O)—CH=CH$_2$)$_2$, —C(CH$_2$—OC(O)—CH=CH$_2$)$_3$, —C(CH$_2$—O—C(O)—CH=CH$_2$)$_2$—CH$_3$, —CH(CH$_2$—O—C(O)—C(CH$_3$)=CH$_2$)$_2$, —C(CH$_2$—OC(O)—C(CH$_3$)=CH$_2$)$_3$, or —C(CH$_2$—O—C(O)—C(CH$_3$)=CH$_2$)$_2$—CH$_3$, Y stands for —CH$_2$—, —C(CH$_3$)$_2$—, —CH(CH$_3$)—, —CH$_2$—O—φ$^1$—(CH$_2$)$_m$—, or —HC[—(CH$_2$)$_m$—O—φ$^1$—(Q)$_n$—φ$^2$—R$^1$]—, wherein the various Y groups may be the same or different, m stands independently for an integer from 0–12, with the proviso that compounds having an oxygen atom in the α or β position vis-à-vis the OH group are excluded, Q stands for —C(O)—O—, —C=C—, —C≡N—, —N=C—, O—C(O)—, —C—C—, —N=N—, or —N(→O)=N—;

R$^1$ stands for —O—R$^2$, —NO$_2$, —CN, —HC=C(CN)$_2$, —C(CN)=C(CN)$_2$, or —R$^2$, R$^2$ stands for an alkyl group having 1–15 carbon atoms, —(CH$_2$)$_k$—O—C(O)—CH=CH$_2$, —(CH$_2$)$_k$—O—C(O)—C(CH$_3$)=CH$_2$, or —(CH$_2$)$_x$—OH, x stands for an integer from 0–12, k stands for an integer from 0–12, with the proviso that k is not 0 or 1 when R$^1$=—O—R$^2$, φ$^1$ stands for a cyclic, aromatic, or heterocyclic compound having 4–10 carbon atoms, which compound may be substituted with a mesogenic group, φ$^2$ stands for a cyclic, aromatic, or heterocyclic compound having 4–10 carbon atoms, which compound may be substituted with a mesogenic group, and n stands for 0 or 1.

Especially suitable di-OH-containing compounds are those according to the formulae below:

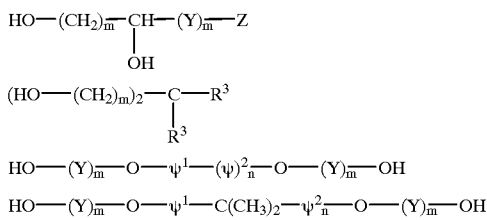

wherein R$^3$ stands for an alkyl group having 1–12 carbon atoms, and Z, Y, φ$^1$, φ$^2$, m, and n have the same meanings as in the formula above, with the m numbers being the same or different.

Suitable mesogenic group-containing mono-epoxides are those satisfying the formulae below:

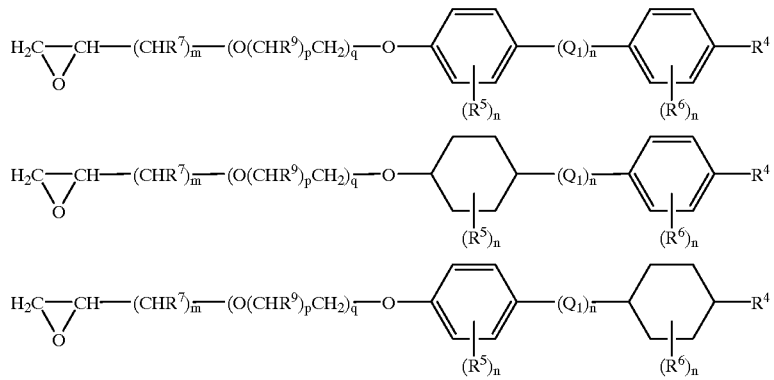

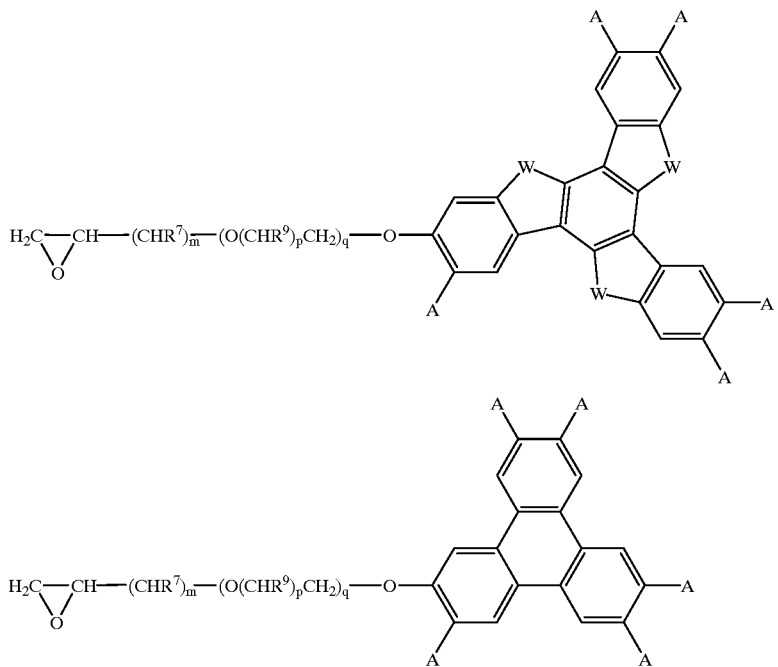

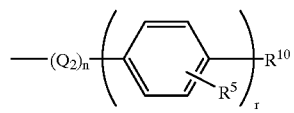

wherein

Q$_1$ stands for —C(O)—O—, —C=C—, —O—C(O)—, —N=C—, —C=N—, —C≡C—, —N=N—, or —N(→O)=N—;

W stands for C, O, or S,

A stands for

—(Q$_2$)$_n$—$\left(\!\!\!\begin{array}{c}\phantom{a}\\R^5\end{array}\!\!\!\right)_r$—R$^{10}$ Q$_2$ stands for —O—C(O)—, —O—, or —O—C(O)—C=C—, R$^4$ stands for —O—R$^8$, —COO—R$^8$, —OCO—R$^8$, —NO$_2$, —CN, —HC=C(CN)$_2$, —C(CN)=C(CN)$_2$, or —R$^8$, R$^5$ stands for an alkyl group having 1–5 carbon atoms, R$^6$ stands for an alkyl group having 1–5 carbon atoms, R$^7$ stands for H or CH$_3$, p is 1–7, m is 0–12 with the proviso that compounds having an oxygen atom in the α or β position vis-à-vis the oxygen of the epoxy group (vicinal or geminal) are excluded, n is 0 or 1, q is 0–3, with the proviso that q≠0 when m=0, r is 0 or 1, R$^8$ stands for an alkyl group having 1–15 carbon atoms, R$^9$ stands for H or an alkyl group having 1–15 carbon atoms, and R$^{10}$ stands for an alkyl of alkoxy group having 1–20 carbon atoms.

Among the epoxides according to the formulae given above, the ones with spacers (thus, m and/or q is not 0) are preferred. Of course, it is also possible to employ mixtures of different mono-epoxides and OH-containing compounds in the monomer mixture. This can be done to adapt the dispersion of the retardation layer to the dispersion of the active cell. For further information on the matching of the dispersion reference may be had to WO 95109379. As mentioned above, it is possible to employ up to 40% of non-mesogenic mono-epoxides, for instance oxiranylmethane, in the monomer mixture.

It also possible to use blends of high-molecular weight liquid crystalline material in order to satisfy the Tc and viscosity requirements. The above-described liquid crystalline polyethers can easily be rendered cross-linkable with photocurable or thermocurable cross-linkers such as polyisocyanates, or by introducing acrylic groups (e.g. acrylate or meth-acrylate groups) into the OH terminated polyethers. Notably, the end-capping with 2-methyl-2-propenoyl chloride is one of the most appropriate routes. It is also possible to employ a certain amount of acrylic group-containing OH-containing compound and/or acrylic group-containing epoxide in the monomer mixture. Examples of suitable acrylic group-containing epoxides are:

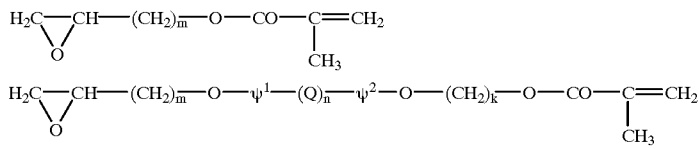

wherein m=1–12, and k, n, $\phi^1$, and $\phi^2$ have the previously given meanings.

Especially suitable is:

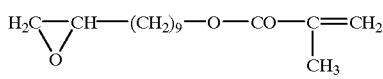

Examples of suitable acrylic group-containing OH-containing compounds are:

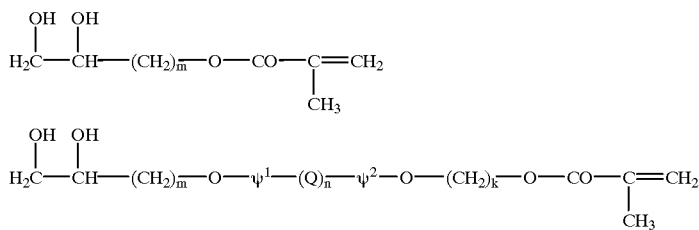

wherein m=1–12, and n, k, $\phi^1$, and $\phi^2$ have the previously given meanings.

In above definitions a cyclic compound means cyclopentyl, cyclohexyl, bicylo-octyl, and the like. Aromatic groups are, for instance, phenyl, biphenyl, naphthyl, and the like. Heterocyclic compounds are cyclic or aromatic compounds which contain one or more hetero atoms, such as nitrogen, oxygen or sulfur. Examples are morpholinyl, piperidinyl, pyrimidinyl, thienyl, pyrrolidinyl, pyridinyl, and the like.

It is possible to add separate acrylate monomers to the acrylic group containing polymer in order to control the physical properties before and after cross-linking (e.g. viscosity before cross-linking and cross-link density).

Figure 2:
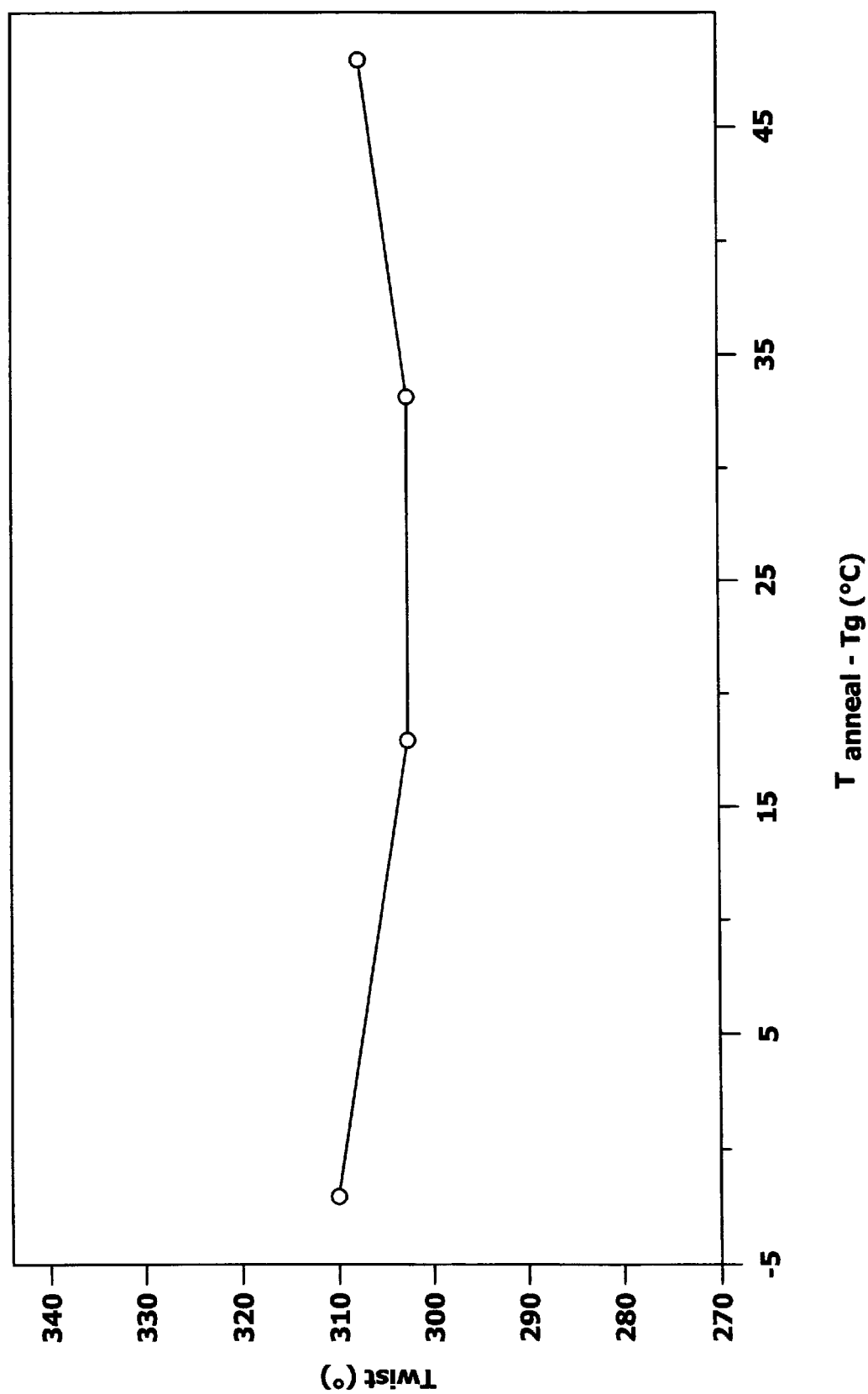
Figure 3:
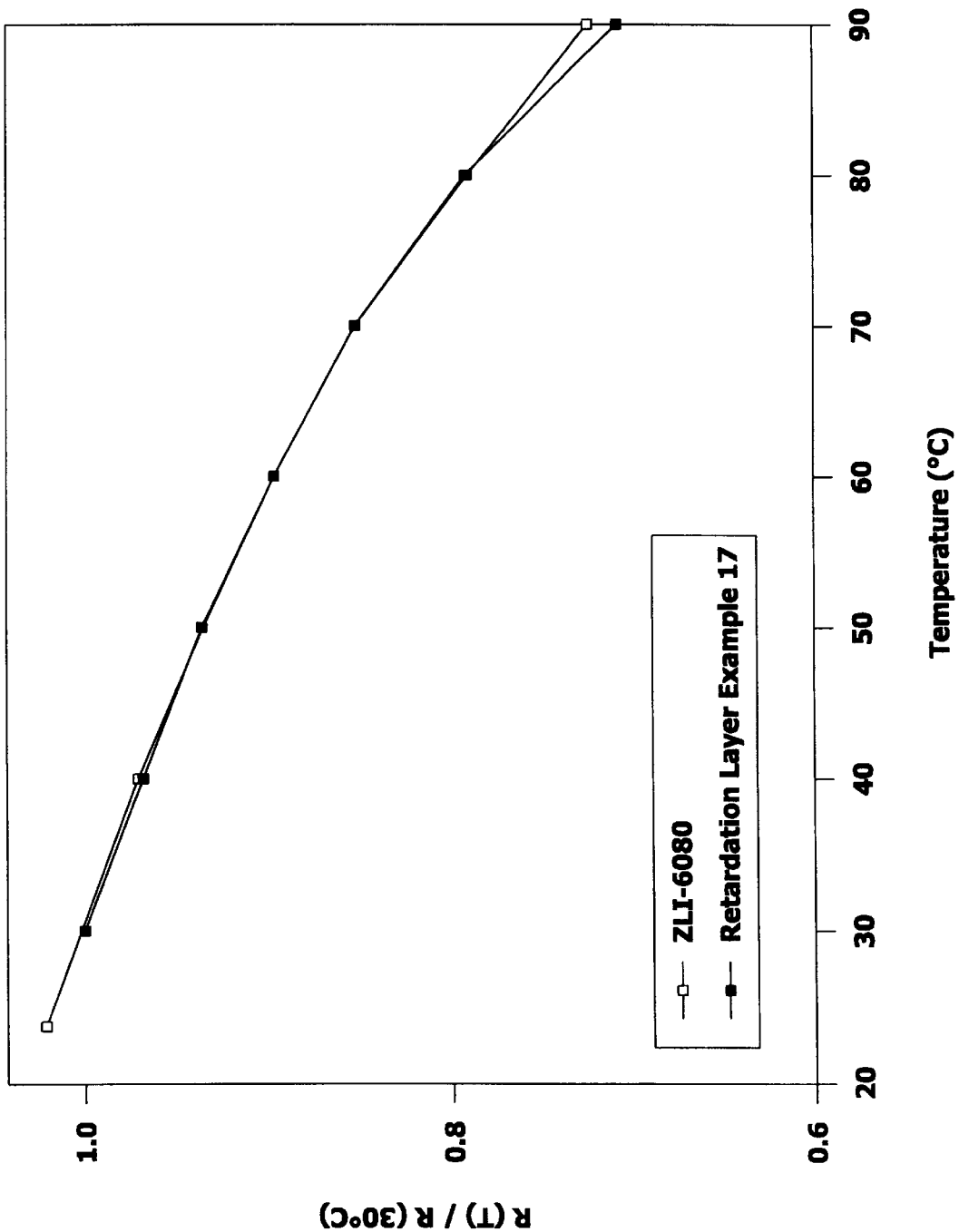

The invention will be further illustrated with reference to the following Examples and drawings wherein:

FIG. 1 illustrates the temperature-dependence of the birefringence of polyether No. 8 of Example II and a commercially available low-molecular mass liquid crystal mixture ("ZLI-5049" from Merck);

FIG. 2 provides a plot of the measured twist angle of the cross-linked retardation layer of Example 9 as a function of the relative annealing temperature; and FIG. 3 illustrates the temperature-dependence of the retardation of a commercially available low-molecular mass liquid crystal mixture ("ZLI-6080" from Merck) and of the retardation layer of Example 17.

EXAMPLE 1

To a mixture of 50 mmoles of 4-methoxyphenyl 4-hydroxybenzoate and 65 mmoles of potassium carbonate in 40 ml of acetone were added 65 mmoles of α,ω-bromo-1-alkene (i.e. 4-bromo-1-butene, 5-bromo-1-pentene, 6-bromo-1-hexene). The resulting mixture was refluxed for twenty-four hours with vigorous stirring. The precipitate was filtered off and the filtrate was added to water and washed with chloroform. The organic layers were combined, washed with water, dried with anhydrous magnesium sulfate, and evaporated to dryness. The crude product was used without further purification.

To a solution of 30 mmoles of 4-methoxyphenyl 4-alkenyloxybenzoate in 60 ml of dichloromethane were added 40 mmoles of m-chloroperbenzoic acid. The mixture was stirred at room temperature for 24 hours, diluted with 60 ml of dichloromethane, and washed with a 5% aqueous solution of sodium carbonate and then with water until neutral. The organic layer was dried over magnesium sulfate and evaporated to dryness. The crude product was recrystallized from methanol.

Polyethers were made of these epoxides and ethylene glycol using the general polymerization procedure described in PCT/EP 95/03176. The resulting properties are compiled in TABLE I, wherein spacer stands for the number of carbon atoms between the epoxy group and the oxygen atom of the mesogenic moiety, and η' stands for the dynamic viscosity at 35° C., 2π rad.s$^{-1}$.

To characterize the mechanical properties of the materials as a function of temperature, dynamic mechanical spectroscopy was applied. This method consists of placing the high-molecular weight liquid crystalline material in a rheometer and applying a small dynamic strain at a frequency of 1 Hz. Depending on the viscosity of the sample studied either a Bohlin CS50 or a Rheometrics RDS-II was used. The stress and strain are then measured as a function of the temperature. The measured stress contains both in-phase elastic response and out-of-phase dissipative response with respect to the applied dynamic strain. This visco-elastic behavior can be described by the G' and G" dynamic shear moduli, where G' is the storage modulus and G" is the loss modulus. The loss modulus G" can be converted into the real part of the dynamic viscosity via the relation G"=η'ω, where ω is the angular frequency, in our case 2π radians/s, and η' is the real part of the dynamic viscosity.

TABLE I

| No. | Spacer | Tg(° C.) | Tc(° C.) | Mw | η'(Pa.s) |
|-----|--------|----------|----------|------|----------|
| 1 | 2 | 27/34 | 139 | 2222 | |
| 2 | 3 | 20/26 | 124 | 2617 | 4 × 10$^4$ |
| 3 | 4 | 15/21 | 121 | 2854 | |

EXAMPLE 2

To a mixture of ethylene glycol and 1.5 mole % of boron trifluoride diethyl etherate (of total amount of epoxide) in dichloromethane there was slowly added dropwise, at room temperature, a mixture of 4-(methoxy)phenyl 4-(oxiranylmethoxy)benzoate and oxiranylmethane dissolved in dichloromethane. The polymerization mixture was stirred overnight. The polyether was precipitated in ether, washed with ether, and dried under vacuum. The yield was 75–90%.

The properties of the resulting polyethers are listed in TABLE II, wherein EP/OH stands for the ratio of epoxide-containing compounds and OH-containing compounds, PO % stands for the mole % oxiranylmethane of the total amount of epoxides, $\alpha'$ for the dynamic viscosity at 35° C., 2 $\pi$rad.s$^{-1}$.

TABLE II

| No. | EP/OH | PO % | Tg (° C.) | Tc (° C.) | $\eta'$ (Pa.s) | Mw |
|-----|-------|------|-----------|-----------|----------------|------|
| 4   | 10/1  | 25   | 28/35     | 84        | $3 \times 10^4$ | 2372 |
| 5   | 10/1  | 40   | 21/31     | 60        |                | 1985 |
| 6   | 10/1  | 50   | 5/16      | —         |                | 1818 |
| 7   | 5/1   | 10   | 32/35     | 101       |                | 1692 |
| 8   | 5/1   | 17.5 | 29/31     | 88        | $4.5 \times 10^4$ | 1564 |
| 9   | 5/1   | 25   | 23/27     | 69        |                | 1503 |

The results in TABLE II show that optimum Tgs and Tcs are obtained when oxiranylmethane is used in an amount up to 25 mole %.

EXAMPLE 3

Blends of polyether according to PCT/EP95/03176 and oxiranylmethyl containing polyethers were made. The polyethers appeared mixable in all ratios. Polyether No. 6 was blended with a polyether of 4-methoxyphenyl 4-(oxiranylmethoxy)benzoate and 4-methoxyphenyl 4-(oxiranylmethoxy)benzoate (EP/OH: 10/1). By varying the ratio it was found possible to obtain blends with Tgs varying from 5/16° C. to 45/51° C. and Tcs up to 146° C.

EXAMPLE 4

To 2.50 g of a 40 wt % solution of polyether No. 7 in cyclopentanone were added 0.03 g of Desmodur N 3390®, ex Bayer AG, and 0.01 g of a 5% solution of dibutyl tin diacetate in cyclopentanone. The polyether solution contained 0.27% w/w of chiral dopant ZLI 4572®, ex Merck. After filtration (0.2 $\mu$m filter) the solution was spin-coated on a 3×3 inch rubbed, PI coated 100 $\mu$m glass substrate and dried for 5 hours in a vacuum oven at 20° C. Subsequently, the 3×3 inch sample was put onto a hot plate at 100° C. and cooled in 5 minutes to 90° C. After 5 hours at 90° C. the sample was cooled to 20° C. A homogeneous retardation film was obtained which at room temperature had a value of retardation of 744 nm at a wavelength of 550 nm and a twist angle of 163°. The dynamic viscosity after cross-linking was found to stay below $10^6$ Pa.s in the temperature range of 50–70° C.

EXAMPLE 5

The temperature-dependence of the birefringence of polyether No. 8 from Example 2 was determined and compared with that of a commercially available low-molecular mass liquid crystal mixture (ZLI-5049®, ex Merck). For this purpose, a small display cell with a thickness of 5.0 $\mu$m was filled with polyether No. 8. The rubbing directions of the two display glass plates coated with an orienting layer were 180° relative to each other. After orientation at 80° C. for two hours, a homogeneous planar orientation of the polyether was obtained. Using a spectrophotometer the retardation value of the display cell, placed between two polarizers, was measured at various temperatures. From the measured retardation value and the thickness of the display cell, the birefringence of the polyether was calculated. For the determination of the temperature-dependence of the birefringence of ZLI-5049 a similar procedure was used.

In FIG. 1, the temperature-dependence of the birefringence of polyether No. 8 and ZLI-5049 are given. The birefringence is normalized to the value at 30° C. This figure shows that the temperature-dependence of the birefringence of polyether No. 8 closely matches that of the commercial display mixture ZLI 5049.

EXAMPLE 6

To a mixture of diol and 1.5 mole % of boron trifluoride diethyl etherate (of total amount of epoxide) in dichloromethane there was slowly added dropwise at room temperature a mixture of 4-methoxyphenyl 4-(oxiranylmethoxy)benzoate in dichloromethane. The polymerization mixture was stirred overnight. The polyether was precipitated in ether, washed with ether, and dried under vacuum. The yield was 75–90%.

The properties of the resulting polyethers using different diols as initiator are listed in TABLE III. The ratio of epoxide to diol was 10:1. PEG stands for polyethylene glycol.

TABLE III

| No. | diol      | Tg(° C.) | Tc(° C.) | Mw   |
|-----|-----------|----------|----------|------|
| 10  | hexanediol | 37/43   | 124      | 3152 |
| 11  | PEG400    | 30/36    | 100      | 2351 |
| 12  | PEG1000   | 30/37    | 97       | 2744 |

EXAMPLE 7

To a solution of 6.00 g of polyether No. 3 (4.53 mmoles OH) in dry THF (tetrahydrofuran) were added 0.38 ml (4.76 mmoles) of dry pyridine. The resulting solution was cooled with an ice bath, and there was added dropwise a solution of 0.46 ml (4.76 mmoles) of 2-methyl-2-propenoyl chloride (methacryloyl chloride) in 5 ml of dry THF. The ice bath was removed and the mixture was allowed to warm to room temperature and heated overnight at reflux temperature. The cooled mixture was filtered in order to remove the formed salt and evaporated to dryness. The residue was dissolved in dichloromethane, precipitated in cold ether, filtered off, rinsed with cold ether, and dried under vacuum. The yield was 4.21 g.

SEC: Mw: 3215; Amount of 2-methyl-2-propenoate (methacrylate) groups built in ($^1$H-NMR): 14.7% Tg: 17/23° C., Tc: 83° C.

EXAMPLE 8

To a mixture of 16 mmoles of ethylene glycol and 1.5 mole % of boron trifluoride diethyl etherate (of total amount of epoxide) in dichloromethane there was slowly added dropwise, at room temperature, a solution of 160 mmoles of 4-methoxyphenyl 4-(4-oxiranylbutoxy)benzoate in 160 ml of dichloromethane. The polymerization mixture was stirred overnight. There was added a solution of 5 mg of lonol and 64 mmoles of triethyl amine in 120 ml of dichloromethane. After stirring for 1 hour the mixture was cooled with an ice-bath and a solution of 64 mmoles of 2-methyl-2-propenoyl chloride in 40 ml of dichloromethane was added dropwise. After the addition the mixture was stirred for 1 hour at room temperature and was refluxed overnight. The reaction mixture was subsequently washed with 1M hydrochloric acid, water, 5% aqueous sodium hydrogencarbonate, water, and brine. Finally the organic layer was dried with anhydrous magnesium sulfate and evaporated to dryness. The resulting polymer was dried under vacuum. The yield was 50.2 g.

SEC: Mw: 3232; Amount of 2-methyl-2-propenoate groups built in ($^1$H-NMR): 15.6%; Tg (DSC): 3/11° C., Tc (DSC): 77° C.

EXAMPLE 9

A 35% w/w solution of the cross-linkable polyether obtained in Example 7 in cyclopentanone containing 2.0% w/w of Irgacure 369®, ex Ciba Geigy, and 0.40% w/w of chiral dopant ZLI 4572®, ex Merck, was spin-coated onto a 3×3 inch rubbed, PI coated 100 μm glass substrate and dried for 20 hours at 20° C. in a vacuum oven. The sample was oriented for 2 hours at 70° C., cured by radiation using a UV-lamp for 60 seconds at 70° C. under a flow of nitrogen, and cooled to 20° C. The dynamic viscosity after cross-linking was found to stay below $10^6$ Pa.s in the temperature range of 50–70° C. The Tg after cross-linking was 33/440° C. and the Tc after cross-linking was 114° C.

EXAMPLE 10

The twist angle of the cross-linked retardation layer of Example 9 was measured as a function of the annealing temperature. The annealing time was kept constant at 24 hours. The twist angle of the sample was measured after fast cooling to room temperature.

n FIG. 2 the measured twist angle is plotted as a function of the relative annealing temperature ($T_{anneal}$-Tg, the Tg being the midpoint of the on/off set of the Tg measured by DSC). As can be seen from this graph, the twist angle is practically constant as a function of temperature for the cross-linked retardation layer.

EXAMPLE 11

The cross-linked retardation layer of Example 9 was placed onto a hot plate outside the clean room at a temperature of 50° C. After 7 days the cross-linked sample despite the presence of dust particles, showed no signs of pinholes.

EXAMPLE 12

The cross-linked retardation layer of Example 9 was laminated with a polarizer with an adhesive (ex Sanritz, LLC2-81-185®). This compensation layer was placed onto a hot plate at a temperature of 60° C. After 24 hours the cross-linked sample was still completely intact. The test was continued for a total time of 340 hours, after which the compensation layer was still intact. The temperature was subsequently raised to 80° C. for 48 hours, which did not affect the cross-linked layer. Finally, the temperature was set at 90° C., and the stability was tested after 500 hours. The cross-linked layer did not show any sign of destruction after this additional annealing treatment of 500 hours at 90° C. at 50% humidity.

EXAMPLE 13

To a solution of 15 g (88 mmoles) of 10-undecen-1-ol in 130 ml of dichloro-methane were added 24 g (70% assay; 97 mmoles) of m-chloroperbenzoic acid. The mixture was stirred at room temperature for 48 hours. The reaction product was washed with a 2% aqueous solution of sodium hydrogensulfite (150 ml), 10% aqueous solution of sodium hydrogen-carbonate (150 ml), and then with water until neutral. The organic layer was dried with anhydrous magnesium sulfate and evaporated to dryness. Yield: 15.7 (96%) of 9-oxiranyinonan-1-ol, which was used without further purification.

To an ice-cooled solution of 15.7 g (84 mmoles) of 9-oxiranyinonan-1-ol and 9.0 g (89 mmoles) of dry triethylamine in 90 ml of dry THF was added a solution of 9.3 g (89 mmoles) of 2-methyl-2-propenoyl chloride in 90 ml of dry THF. The mixture was stirred at room temperature overnight. The precipitated salts were filtered off, the filtrate was poured into 500 ml of 0.1M hydrochloric acid, and the resulting aqueous mixture was washed with diethyl ether. The combined organic layers were washed with a 5% aqueous solution of sodium hydrogencarbonate, water, and brine, dried with anhydrous magnesium sulfate, and evaporated to dryness. The crude product was purified by distillation (150° C., 10 Pa). Yield: 14.7 g (70%).

To a mixture of ethylene glycol and 1.5 mole % of boron trifluoride diethyl etherate (of total amount of epoxide) in dichloromethane there was slowly added dropwise at room temperature a mixture of 9-oxiranylnonyl 2-methyl-2-propenoate (C9%) and 4-methoxyphenyl 4-(4-oxiranylbutoxy)benzoate ((100-C9)%) dissolved in dichloromethane. The polymerization mixture was stirred overnight. The reaction mixture was worked up by washing with brine. The organic layer was dried with anhydrous magnesium sulfate and evaporated to dryness. The product was dried under vacuum. The yield was: quantitative.

The properties of the resulting polyethers are listed in TABLE IV, wherein C9% stands for the mole % of 9-oxiranylnonyl 2-methyl-2-propenoate in the monomer mixture and MA % stands for the mole % 2-methyl-2-propenoate groups incorporated into the polymer (analyzed by $^1$H-NMR). The ratio of epoxides to diol was 10:1.

TABLE IV

| No. | C9% | MA % | Tg(° C.) | Tc(° C.) | Mw |
|---|---|---|---|---|---|
| 15 | 17.5 | 17 | −2/5 | 76 | 3096 |
| 16 | 20 | 18 | −5/5 | 70 | 3064 |

EXAMPLE 14

A 50% w/w solution of polyether No. 15 of Example 13 in a methoxy-benzene solution containing 2% w/w Irgacure 369®, ex Ciba Geigy, and 0.24% w/w of chiral dopant ZLI 4571®, ex Merck, was spin-coated onto a 3×3 inch 100 μm glass substrate with a rubbed polyimide orientation layer. The sample was dried for 30 minutes at 40° C. and 2 hours at 20° C. in a vacuum oven. After orientation for 20 hours at 40° C., the sample was irradiated for 60 seconds at 40° C. with a UV lamp (power density 3.5 mW/cm$^2$) under a flow of nitrogen. The cured material had a Tg of 17/26° C. and a Tc of 98° C. At room temperature the retardation film obtained had a value of retardation of 940 nm at a wavelength of 550 nm, and a twist angle of −161°.

EXAMPLE 15

A solution of 40% w/w of polyether No. 16 of Example 13 in methoxy-benzene was applied onto a rubbed amorphous polyolefin (Zeonex 250®) substrate. The sample was dried for 15 minutes at 20° C. and 40 minutes at 40° C. The sample was oriented for 60 minutes at 45° C. The sample was irradiated for 60 seconds at 45° C. with a UV lamp under a flow of nitrogen. An oriented retardation layer was obtained.

EXAMPLE 16

To a mixture of 2,3-dihydroxypropyl 2-methyl-2-propenoate and 1.5 mole % of boron trifluoride diethyl etherate (of total amount of epoxide) in dichloromethane was slowly added dropwise at room temperature a mixture of 9-oxiranylnonyl 2-methyl-2-propenoate (C9%) and 4-methoxyphenyl 4-(4-oxiranylbutoxy)benzoate ((100-C9) %) dissolved in dichloromethane. The polymerization mixture was stirred overnight. The reaction mixture was worked up by washing with brine, and the resulting organic layer was dried with anhydrous magnesium sulfate and evaporated to dryness. The product was dried under vacuum to give it in a quantitative yield.

The properties of the resulting polyethers are listed in TABLE V, wherein C9% stands for the mole % of 9-oxiranylnonyl 2-methyl-2-propenoate in the monomer mixture and MA % stands for the mole % 2-methyl-2-propenoate groups incorporated into the polymer (analyzed by $^1$H-NMR). The ratio of epoxides to diol was 10:1.

TABLE V

| No. | C9% | MA % | Tg(° C.) | Tc(° C.) | Mw |
|-----|-----|------|----------|----------|------|
| 17  | 5   | 13   | 5/12     | 94       | 2898 |
| 18  | 7.5 | 14   | 2/11     | 90       | 2914 |
| 19  | 8   | 17   | -6/5     | 78       | 2963 |
| 20  | 10  | 18   | -2/6     | 82       | 2863 |
| 21  | 15  | 21   | -7/6     | 70       | 1962 |

EXAMPLE 17

A 50% w/w solution of the polyether No. 20 of Example 16 in a methoxybenzene solution containing 2% w/w Irgacure 369®, ex Ciba Geigy, and 0.35% w/w of chiral dopant ZLI 4571®, ex Merck, was spin-coated onto a 3×3 inch rubbed polyimide coated glass substrate of 100 μm. The sample was dried for 30 minutes at 40° C. After orientation for 30 minutes at 60° C. the sample was irradiated for 60 seconds at 60° C. with a UV lamp (power density 3.5 mW/cm²) under a flow of nitrogen. A well-oriented retardation layer was obtained.

EXAMPLE 18

The temperature-dependence of the retardation value of the retardation layer of Example 17 was determined and compared with that of a commercially available low-molecular mass liquid crystal mixture (ZLI-6080®, ex Merck). The retardation value was determined by measuring the transmission of the retardation film placed between two polarizers using a spectrophotometer. For the determination of the temperature-dependence of the birefringence of ZLI-6080 the procedure as described in Example 5 for ZLI-5049 was used.

In FIG. 3, the temperature-dependence of the retardation of ZLI 6080 and the retardation layer of Example 17 are given. The birefringence is normalized to the value at 30° C. This figure shows that the temperature-dependence of the birefringence of polyether No. 20 matches that of the commercial display mixture ZLI 6080 very closely.

EXAMPLE 19

A 50% w/w solution of the polyether No. 19 of Example 16 in methoxybenzene containing 2% w/w Irgacure 369®, ex Ciba Geigy, and 0.35% w/w of chiral dopant ZLI 4571®, ex Merck, was spin-coated onto a 3×3 inch rubbed TAC substrate (Triphan 80R®, ex Lonza). The sample was dried for 20 minutes at 40° C. After orientation for 30 minutes at 65° C. the sample was irradiated for 60 seconds at 65° C. with a UV lamp (power density 3.5 mW/cm²) under a flow of nitrogen. An oriented retardation layer was obtained.

COMPARATIVE EXAMPLE 20

The dynamic mechanical response of a commercially available low-molecular weight liquid crystalline material for (S)TN displays (ZLI5049®, ex Merck) was measured. The dynamic viscosity was found to be between 0.01 and 0.1 Pa.s in the temperature range of 0–40° C., reflecting the high mobility of such materials. These materials have viscosities lower than 50 Pa.s in the working temperature and, therefore, this type of liquid crystalline material has to be placed within a rigid cell and is not suitable for use as a free-standing retardation layer.

We claim:
1. A liquid crystalline display comprising a display cell containing liquid crystalline material and a retardation layer, said retardation layer comprising a high-molecular weight material layer, a low molecular weight material and a substrate, wherein the high-molecular weight material has a nematic phase above its Tg and a dynamic viscosity at a working temperature of at least 100 Pa.s, and the difference of the Tc of the high-molecular weight material and the Tc of the low-molecular weight material of the display cell is in the range of –30° C. to +30° C., and the Tg of the high-molecular weight liquid crystalline material is lower than 50° C.

2. The liquid crystalline display of claim 1 wherein the high-molecular weight material of the retardation layer is slightly cross-linked so as not to alter the dynamic viscosity to above $10^7$ Pa.s at 55° C. or higher.

3. The liquid crystalline display of claim 1 wherein the Tg of the high-molecular weight liquid crystalline material is –50 to +35° C. and the high-molecular weight material of the retardation layer is slightly cross-linked so as not to alter the dynamic viscosity to above $10^7$ Pa.s at 55° C. or higher.

4. The liquid crystalline display of any one of claims 1–3 wherein the high-molecular weight material layer has a chiral nematic calamitic or discotic structure.

5. The liquid crystalline display of any one of claims 1–3 wherein the high-molecular weight material is a polyether obtainable by polymerizing a monomer mixture comprising:
   a) an OH-containing compound; and
   b) a mesogenic group-containing mono-epoxide
      and wherein the high-molecular weight material layer has a chiral nematic calamitic or discotic structure.

6. The liquid crystalline display of claim 5 wherein the monomer mixture comprises oxiranylmethane.

7. The liquid crystalline display of claim 5 wherein the mesogenic group-containing mono-epoxide has a spacer.

8. The liquid crystalline display of claim 5 wherein the epoxy groups/hydroxy groups ratio in the monomer mixture is in the range of 5:1 to 1:1.

9. The liquid crystalline display according to claim 5 wherein the OH-containing compound is a mono-OH-containing compound according to the formula below:

HO—(Y)$_m$—Z wherein:

Z stands for H (when m≠0), —O—C(O)—CH=CH$_2$, —O—C(O)—C(CH$_3$)=CH$_2$, a cyclic, aromatic, or heterocyclic compound having 4–10 carbon atoms, which compound may comprise a mesogenic group, —CH(CH$_2$—O—C(O)—CH=CH$_2$)$_2$, —C(CH$_2$—OC(O)—CH=CH$_2$)$_3$, —C(CH$_2$—O—C(O)—CH=CH$_2$)$_2$—CH$_3$, —CH(CH$_2$—O—C(O)—C(CH$_3$)=CH$_2$)$_2$, —C(CH$_2$—OC(O)—C(CH$_3$)=CH$_2$)$_3$, or —C(CH$_2$—O—C(O)—C(CH$_3$)=CH$_2$)$_2$—CH$_3$;

Y stands for —CH$_2$—, —C(CH$_3$)$_2$—, —CH(CH$_3$)—, —CH$_2$-O—$\phi^1$—(CH$_2$)$_m$—, or —HC[—(CH$_2$)$_m$—O—$\phi^1$—(Q)$_n$—$\phi^2$—R$^1$]—, wherein the various Y groups may be the same or different;

m stands independently for an integer from 0–12, with the proviso that compounds having an oxygen atom in the α or β position with regard to the OH group are excluded;

Q stands for —C(O)—O—, —C=C—, —C=N—, —N=C—, O—C(O)—, —C≡C—, —N=N—, or —N(→O)=N—;

R$^1$ stands for —O—R$^2$, —NO$_2$, —CN, —HC=C(CN)$_2$, —C(CN)=C(CN)$_2$, or —R$^2$;

R$^2$ stands for an alkyl group having 1–15 carbon atoms, —(CH$_2$)$_k$—O—C(O)—CH=CH$_2$, —(CH$_2$)$_k$—O—C(O)—C(CH$_3$)=CH$_2$, or —(CH$_2$)$_x$—OH;

x stands for an integer from 0–12;

k stands for an integer from 0–12, with the proviso that k is not 0 or 1 when R$^1$=—O—R$^2$;

$\phi^1$ stands for an cyclic, aromatic, or heterocyclic compound having 4–10 carbon atoms, which compound may be substituted with a mesogenic group;

$\phi^2$ stands for a cyclic, aromatic, or heterocyclic compound having 4–10 carbon atoms, which compound may be substituted with a mesogenic group; and n stands for 0 or 1.

10. The liquid crystalline display of claim 5 wherein the OH-containing compound is a compound according to any one of the formulae below:

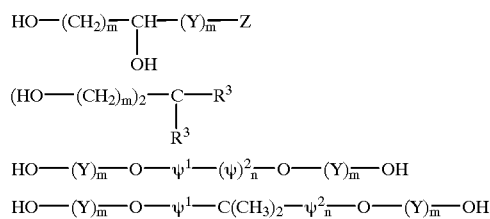

wherein R$^3$ stands for an alkyl group having 1–12 carbon atoms, and Z, Y, $\phi^1$, $\phi^2$, m, and n have the same meaning as in the formula of claim 9.

11. The liquid crystalline display of claim 5 wherein the mesogenic group-containing mono-epoxide group satisfies one of the formulae below:

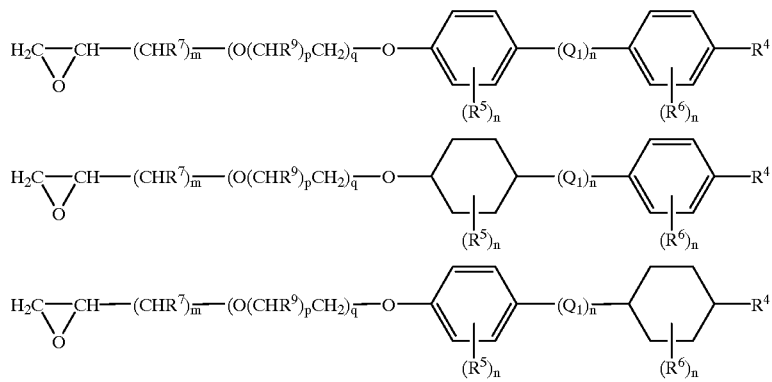

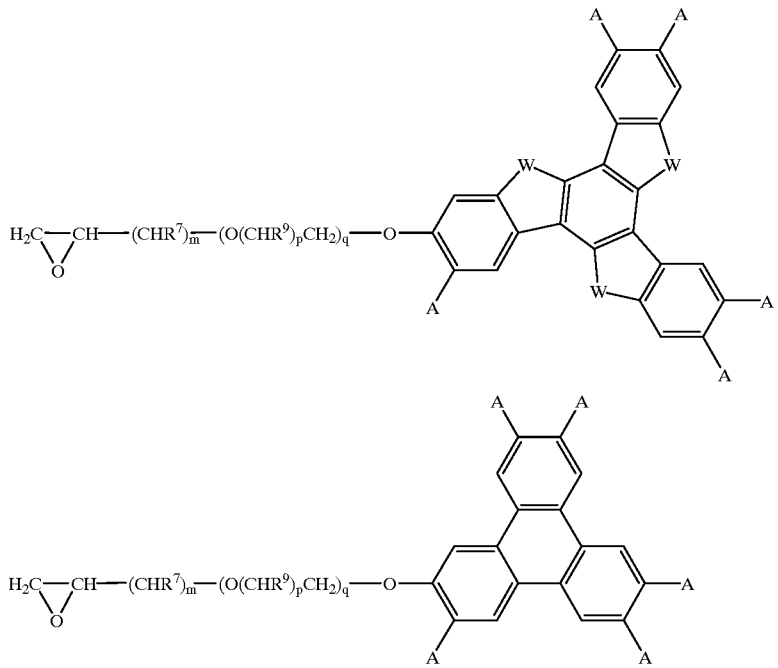

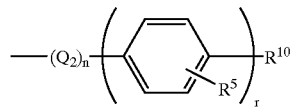

wherein $Q_1$ stands for —C(O)—O—, —C=C—, —O—C(O)—, —N=C—, —C=N—, —C≡C—, —N=N—, or —N(→O)=N—;

W stands for C, O, or S;

A stands for $$—(Q_2)_n—\left(\!\!\begin{array}{c}\phantom{x}\\\phantom{x}\\R^5\end{array}\!\!\right)_{\!r}\!\!—R^{10}$$

$Q_2$ stands for —O—C(O)—, —O—, or —O—C(O)—C=C—;

$R^4$ stands for —O—$R^8$, —COO—$R^8$, —OCO—$R^8$, —$NO_2$, —CN, —HC=C(CN)$_2$, —C(CN)=C(CN)$_2$, or —$R^8$;

$R^5$ stands for an alkyl group having 1–5 carbon atoms;

$R^6$ stands for an alkyl group having 1–5 carbon atoms;

$R^7$ stands for H or $CH_3$;

p is 1–7;

m is 0–12 with the proviso that compounds having an oxygen atom in the α or β position vis-à-vis the oxygen of the epoxy group are excluded;

n is 0 or 1;

q is 0–3, with the proviso that q≠0 when m=0;

r is 0 or 1;

$R^8$ stands for an alkyl group having 1–15 carbon atoms;

$R^9$ stands for H or an alkyl group having 1–15 carbon atoms; and $R^{10}$ stands for an alkyl or alkoxy group having 1–20 carbon atoms.

12. A slightly cross-linkable or cross-linked liquid crystalline polyether not having a dynamic viscosity to above $10^7$ Pa.s at 55° C. or higher obtainable by polymerizing a monomer mixture comprising:

a) an OH-containing compound;

b) a measogenic group-containing mono-epoxide; and c) an acrylic group-containing epoxide or OH-containing compound.

13. The liquid crystalline display of claim 1 wherein the Tc of the low-molecular weight material of the display cell is in the range of −20° C. to +20° C.

14. The liquid crystalline display of claim 1 wherein the Tc of the low-molecular weight material of the display cell is in the range of −10° C. to +10° C.

* * * * *